US012807023B2

(12) United States Patent
Danilovic et al.

(10) Patent No.: US 12,807,023 B2
(45) Date of Patent: Nov. 24, 2026

(54) BIDIRECTIONAL WIRELESS POWER TRANSFER

(71) Applicant: WiTricity AI Tech, LLC, Stuart, FL (US)

(72) Inventors: Milisav Danilovic, Watertown, MA (US); Nam Hoai Le, Watertown, MA (US)

(73) Assignee: WiTricity AI Tech, LLC, Stuart, FL (US)

( * ) Notice: Subject to any disclaimer, the term of this patent is extended or adjusted under 35 U.S.C. 154(b) by 0 days.

(21) Appl. No.: 19/067,463

(22) Filed: Feb. 28, 2025

(65) Prior Publication Data

US 2025/0276598 A1 Sep. 4, 2025

Related U.S. Application Data

(60) Provisional application No. 63/561,185, filed on Mar. 4, 2024.

(51) Int. Cl.
*B60L 53/62* (2019.01)
*B60L 53/122* (2019.01)
(Continued)

(52) U.S. Cl.
CPC ............. *B60L 53/62* (2019.02); *B60L 53/122* (2019.02); *B60L 53/66* (2019.02); *B60L 55/00* (2019.02);
(Continued)

(58) Field of Classification Search
CPC ........ B60L 53/62; B60L 53/122; B60L 53/66; B60L 55/00; B60L 53/12; H02J 50/12;
(Continued)

(56) References Cited

U.S. PATENT DOCUMENTS

| | | | | |
|---|---|---|---|---|
| 6,570,780 B2 * | 5/2003 | Furukawa | ......... | H02M 7/53875 363/132 |
| 10,461,566 B2 * | 10/2019 | Lee | ......................... | H02J 50/05 |

(Continued)

OTHER PUBLICATIONS

"International Search Report and Written Opinion", Application No. PCT/US2025/018088, Jul. 11, 2025, 21 pages.

(Continued)

*Primary Examiner* — Frederick M Brushaber
(74) *Attorney, Agent, or Firm* — Colby Nipper PLLC

(57) ABSTRACT

A bidirectional wireless power transfer (WPT) system includes a WPT resonator, a power transfer connection for coupling to a battery, a bidirectional power converter coupled to the WPT resonator and to the power transfer connection, a communication interface for communicating with another bidirectional WPT system to which the WPT resonator is configured to be coupled, and a controller. The controller is configured to determine first, second, and third control parameters, control the bidirectional power converter based on the first and second control parameters, and communicate the third control parameter to the other bidirectional WPT system. The controller may operate in a power-controlled mode when delivering power to a vehicle battery, and in a voltage controlled mode when transferring power from the vehicle battery to a load or the Grid.

21 Claims, 6 Drawing Sheets

(51) Int. Cl.

| | |
|---|---|
| ***B60L 53/66*** | (2019.01) |
| ***B60L 55/00*** | (2019.01) |
| ***H02J 50/12*** | (2016.01) |
| ***H02M 1/00*** | (2006.01) |
| ***H02M 3/00*** | (2006.01) |
| ***H02M 3/335*** | (2006.01) |

(52) U.S. Cl.
CPC ........... *H02J 50/12* (2016.02); *H02M 1/0043* (2021.05); *H02M 3/01* (2021.05); *H02M 3/33584* (2013.01)

(58) Field of Classification Search
CPC .... H02J 2105/37; H02M 1/0043; H02M 3/01; H02M 3/33584; H02M 1/0058; H02M 7/219; H02M 7/4815; H02M 7/5387; Y02T 10/70; Y02T 10/7072; Y02T 90/14
See application file for complete search history.

(56) References Cited

U.S. PATENT DOCUMENTS

| | | | | |
|---|---|---|---|---|
| 2012/0306286 | A1* | 12/2012 | Kim | B60L 53/122 307/104 |
| 2013/0033118 | A1* | 2/2013 | Karalis | B60L 53/126 307/104 |
| 2013/0188397 | A1* | 7/2013 | Wu | B60L 53/122 363/17 |
| 2014/0077614 | A1* | 3/2014 | Park | H02J 50/90 307/104 |
| 2014/0268897 | A1* | 9/2014 | Zimmanck | H02M 3/3353 363/17 |
| 2015/0341087 | A1* | 11/2015 | Moore | H01F 38/14 455/77 |
| 2016/0043562 | A1* | 2/2016 | Lisi | H02J 50/12 307/104 |
| 2016/0176300 | A1* | 6/2016 | Bucher | B60L 53/12 307/104 |
| 2019/0109481 | A1* | 4/2019 | Lee | H02J 50/05 |
| 2020/0177028 | A1* | 6/2020 | Esteban | H02J 50/12 |
| 2021/0135666 | A1* | 5/2021 | Wang | B60L 53/122 |

OTHER PUBLICATIONS

"International Preliminary Report on Patentability", Application No. PCT/US2025/018088, Sep. 8, 2026, 18 pages.

* cited by examiner

BIDIRECTIONAL WIRELESS POWER TRANSFER

CROSS-REFERENCE TO RELATED APPLICATION(S)

This application claims the benefit of U.S. Provisional Patent Application Ser. No. 63/561,185 filed on Mar. 4, 2024, the disclosure of which is incorporated by reference herein in its entirety.

TECHNICAL FIELD

This application relates to bidirectional wireless power transfer, and, in particular, to bidirectional wireless power transfer between an electric vehicle and an external load, or the electrical Grid.

BACKGROUND

Wireless power transfer (WPT) for charging the traction batteries of electric vehicles (EVs) has been standardized and is beginning to be available on the market. Plug-in or "wired" charging systems capable of bidirectional power transfer, such as vehicle-to-load (V2L) or vehicle-to-grid (V2G), generally V2X, are also available, but are not yet standardized. Among other things, whether conversion from the direct current (DC) voltage of a battery to the alternating current (AC) voltage of the Grid should be done by the on board charger (OBC) of the vehicle or in an external power electronics system remains an open question. Bidirectional wireless power transfer has been suggested and has been achieved in consumer electronic devices such as mobile phones.

SUMMARY

In general, in some aspects, a bidirectional wireless power transfer (WPT) assembly includes a WPT resonator, a power transfer connection for coupling to a battery, a bidirectional power converter coupled to the WPT resonator and to the power transfer connection, a communication interface for communicating with another bidirectional WPT system to which the WPT resonator is configured to be coupled, and a controller. The controller is configured to determine first, second, and third control parameters, control the bidirectional power converter based on the first and second control parameters, and communicate the third control parameter to the other bidirectional WPT system.

In general, in some aspects, a bidirectional wireless power transfer (WPT) controller includes an output for providing control commands to a bidirectional power converter, an input for receiving operating parameters of the bidirectional power converter and a target output value, and a communication interface for communicating with another bidirectional WPT system. The controller is configured to determine first, second, and third control parameters, communicate the first and second control parameter to the bidirectional power converter, and communicate the third control parameter to the other bidirectional WPT system. The operating parameters include output voltage and output power of the bidirectional power converter, the target output value is selected from one of output power or output voltage of the bidirectional power converter, the first control parameter is based on the output power, and the second and third parameters are based on whichever of output voltage or output power is selected as the target output value.

Implementations may include one or more of the following, in any order or combination. The bidirectional WPT assembly is installed in a vehicle, and, during a vehicle charging mode of operation, is configured to determine the control parameters based on output power of the bidirectional WPT assembly. The bidirectional WPT assembly is installed in a wireless electric vehicle charging station (WEVC), and, during a V2x mode of operation, is configured to determine the first control parameter based on output power and determine the second and third control parameters based on output voltage of the bidirectional WPT assembly. The first control parameter includes a target phase shift between a current and voltage input at the bidirectional power converter. The controller includes a zero voltage switching (ZVS) controller, which receives as input a first input parameter representing power at an output of the bidirectional power converter, and outputs the first control parameter. The first input parameter includes a product of current and voltage measured at the output of the bidirectional power converter. The second control parameter includes a target duty cycle of the bidirectional power converter. The controller further includes a power controller, which receives as input a second input parameter comprising a difference between the first input parameter and a third input parameter including a requested amount of power, and outputs the second control parameter. The ZVS controller further receives as input the second control parameter, as output from the power controller. The power controller further outputs the third control parameter, and the third control parameter includes a target coil current in a WPT resonator of the other WPT assembly. The controller is further configured to generate an initial value of the third control parameter, and to control whether the initial value of the third control parameter or a value output by the power controller is provided to the other WPT assembly. The controller is configured to generate the initial value of the third control parameter from a measured value of current into the bidirectional power converter and a minimum current value. The second control parameter includes a target duty cycle of the bidirectional power converter, the third control parameter includes a target coil current in a WPT resonator of the other WPT assembly, and the controller is configured to update the first control parameter more frequently than it updates the second and third control parameters. The controller is configured to determine the second and third control parameters together. The controller is configured to determine the second and third control parameters independently of each other.

In general, in some aspects, a method of controlling a bidirectional wireless power transfer (WPT) assembly is disclosed. The method includes determining first, second, and third control parameters for a bidirectional power converter coupled to a WPT resonator and to a power transfer connection, controlling the bidirectional power converter based on the first and second control parameters; and communicating the third control parameter to another bidirectional WPT assembly.

Implementations may include one or more of the following, in any order or combination. The determining the first control parameter includes determining a target phase shift between a current and voltage input at the bidirectional power converter based on a first input parameter representing power at an output of the bidirectional power converter. The first input parameter includes a product of current and voltage measured at the output of the bidirectional power converter. The determining the second control parameter includes determining a target duty cycle of the bidirectional power converter based on a second input parameter including a difference between the first input parameter and a third input parameter including a requested amount of power. The second control parameter includes a target duty cycle of the bidirectional power converter, the third control parameter includes a target coil current in a WPT resonator of the other WPT assembly, and the method further includes updating the first control parameter more frequently than the second and third control parameters are updated.

Various embodiments can include one or more of the foregoing features, in any combination.

DETAILED DESCRIPTION

Figure 1:
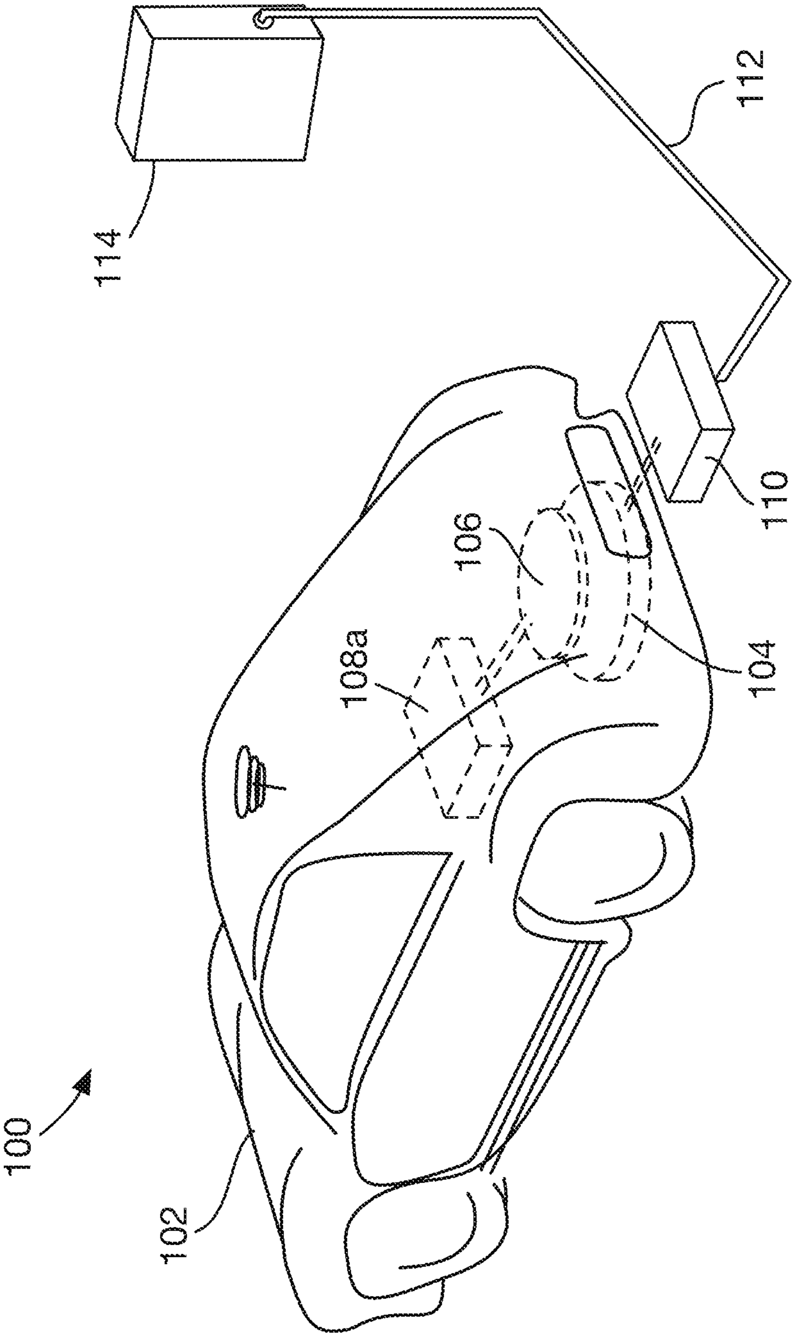
FIG. 1 illustrates a wireless electric vehicle charging station and a vehicle.

Wireless power transfer (WPT) for charging electric vehicles is described in detail in patents such as U.S. Pat. No. 8,933,594, titled "Wireless energy transfer for vehicles," and U.S. Pat. No. 9,561,730, titled "Wireless power transmission in electric vehicles," which are incorporated here by reference in their entirety. Wireless electric vehicle charging (WEVC) systems according to the SAE J2954 standard, as of the date of filing of this application, provide up to 22 kW of power at each charging station. Lower power levels, such as 11 kW and 7 kW, are commonly used, due to their compatibility with household and industrial electrical systems. At the same time, higher power levels are also used, especially for charging heavier-duty vehicles, like busses or trucks, or for charging light duty vehicles at a higher rate, and proposals have been made to extend existing WEVC standards to such power levels. Lower-power vehicles, such as scooters, golf carts, neighborhood electric vehicles (NEVs), or industrial vehicles like forklifts and automated ground vehicles (AGVs) may also be charged using WPT, but standards for doing so do not currently exist, though several are in development. References herein to "AC power," "DC power," or "AC" and "DC" alone should be understood as referring to power that is transferred as electricity having the corresponding current waveform.

Wireless vehicle charging uses power converters on both sides of the WPT connection, to convert 50 Hz or 60 Hz AC power from the Grid to, for example, 85 kHz power (referred to as low-frequency, LF, power) for conversion from electric current to a magnetic field on the transmitter side, and then from the LF magnetic field to LF electric current and then to DC power within the vehicle for charging the battery. Wireless power transfer through an electromagnetic field inherently isolates the vehicle electrical system from the Grid, while wired charging solutions require an isolation stage in the vehicle, in the external charger, or both. Sometimes the isolation is implemented within a power conversion stage, such as an isolation transformer as part of a DC-DC converter. In some examples, as described in U.S. Pat. Nos. 9,561,730 and 9,381,821 and co-pending application [Provisional App. 63/556,601], all incorporated here by reference, various power converters or components of the power converters are shared between wired and wireless charging systems.

For bidirectional power transfer, the general assumption has been that simply making each stage of power conversion itself bidirectional, such as by using a switching rectifier rather than a diode bridge for AC to DC conversion, is sufficient to make the entire power transfer chain bidirectional. This disclosure discusses details of the control logic for a bidirectional system, which are not necessarily the same for V2G and G2V operation, and which may improve ordinary G2V operation by virtue of the additional control capabilities of a bidirectional system.

FIG. 1 shows an example of a parking facility 100 with wireless power transfer services. A vehicle 102 is parked over a WPT pad 104. Although shown as car in FIG. 1, any type of vehicle, such as a golf cart, neighborhood electric vehicle, delivery van, bus, AGV, etc., can be charged in the same way. WPT pad 106 in the vehicle is connected to a power converters 108. The power converter 108 converts power received by the pad 106 to a form suitable for charging the vehicle's traction battery, not shown. In some examples, the power converter 108 may be integrated with power converters used for plug-in charging of the vehicle, commonly called on-board chargers (OBC), or other on-board vehicle components. The ground-side WPT pad 104 is shown with an external power converter 110 connected to a power supply cable 112. The power supply cable 112 is in turn connected to a power converter 114. In some examples, the power converter 114 provides DC power over the cable 112 and the external power converter 110 includes inverters, such as the multi-level inverter (MLI) described in U.S. patent application Ser. Nos. 18/486,830 and 18/486,835, both filed Oct. 13, 2023, and incorporated here by reference. The inverters provide low-frequency (LF) power signals, such as the 85 kHz signals used for wireless charging according to the SAE J2954 standard, to the pad 104, to turn into magnetic fields for wireless power transfer. In other examples, inverters included in the power converter 114 provide the LF power signals over the cable 112, and the power converter 110 may be omitted, or may provide only limited features, such as impedance matching. The power converter 110 may also be integrated into the pad 104. In some examples, the pad 104 is referred to as the Ground Assembly Resonator (GAR), and the combination of the GAR with the power converter 110 or any other ground-side electronics is referred to as a Ground Assembly (GA), whether integrated or housed separately. Similarly, the WPT pad 106 may be referred to as the Vehicle Assembly Resonator (VAR) and the combination of the VAR and the power converter 108 or any other vehicle-side electronics as a Vehicle Assembly (VA), again, whether integrated or housed separately. Each of the connections shown may be bidirectional, allowing the vehicles to discharge power from their batteries to the power converter 114 in a V2x arrangement.

Figure 2:
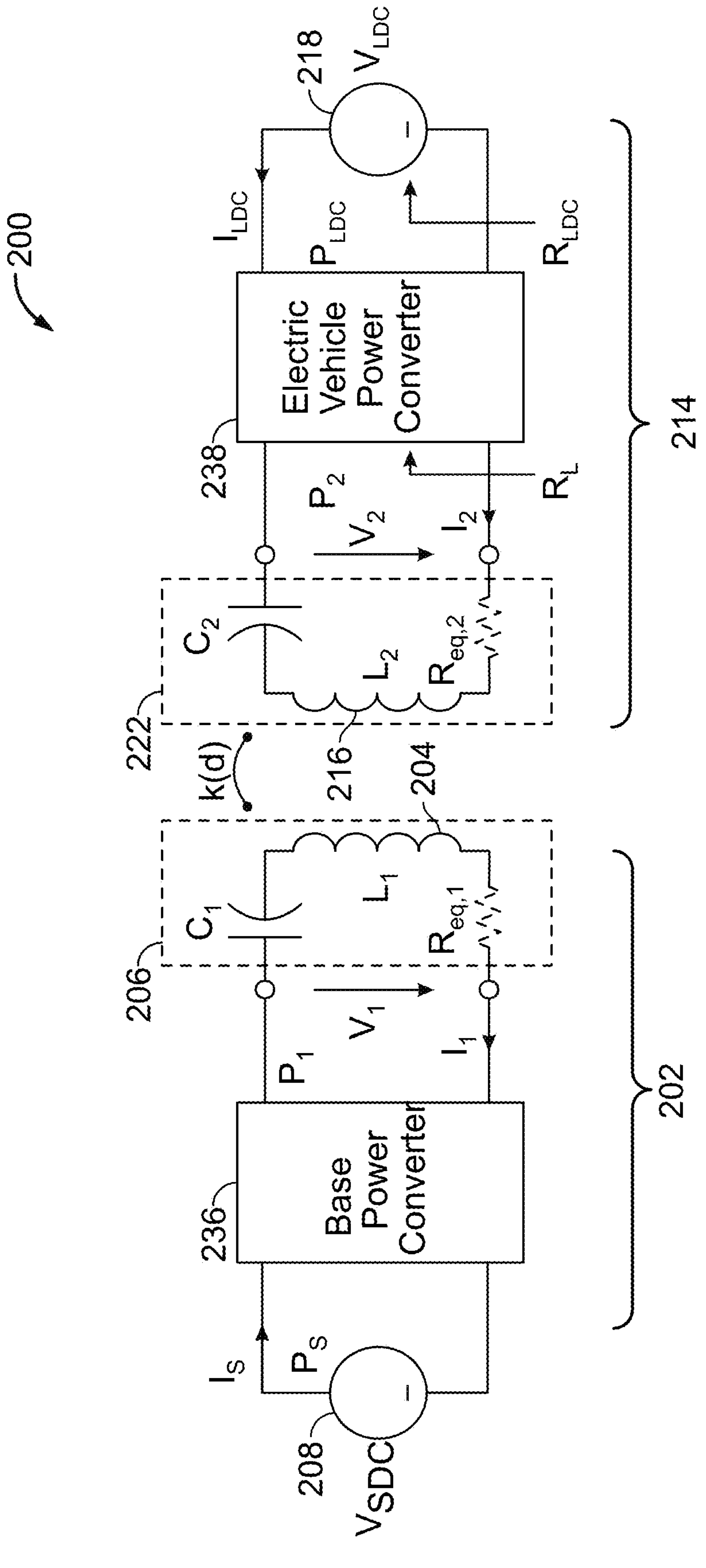
FIGS. 2, 3, 4, and 6 are block diagrams of wireless power transfer systems.

FIG. 2 is a schematic diagram of exemplary components of a wireless power transfer system 200 such as that shown in FIG. 1. The wireless power transfer system 200 includes a base resonant circuit (e.g., GAR 206) including a coil 204 having an inductance L1. The wireless power transfer system 200 further includes an electric vehicle resonant circuit (e.g., VAR 222) including a coil 216 having an inductance L2. Implementations may use capacitively loaded conductor loops (e.g., multi-turn coils) forming a resonant structure that is capable of efficiently coupling energy from a primary structure (transmitter) to a secondary structure (receiver) via a magnetic or electromagnetic near field if both the transmitter and the receiver are tuned to a common resonant frequency. The coils may be used for the coil 216 and the coil 204. Using resonant structures for coupling energy may be referred to as "magnetically coupled resonance," "electromagnetically coupled resonance," or "resonant induction."

A power supply 208 supplies power $P_S$ to the base power converter 236 to transfer energy to the electric vehicle. The base power converter 236 may include circuitry such as an AC-to-DC converter configured to convert power from standard Grid-supplied AC to DC power at a suitable voltage level, and a DC-to-LF converter configured to convert DC power to LF power at an operating frequency suitable for wireless power transfer. The base power converter 236 supplies power $P_1$ to the GAR 206 including tuning capacitor $C_1$ in series with coil 204 to emit an electromagnetic field at the operating frequency. The series-tuned resonant circuit shown for GAR 206 should be construed as exemplary. In another implementation, the capacitor $C_1$ may be coupled with the coil 204 in parallel. In yet other implementations, tuning may be provided by several reactive elements in any combination of parallel or series topology. The capacitor $C_1$ may be provided to form a resonant circuit with the coil 204 that resonates substantially at the operating frequency. The coil 204 receives the power $P_1$ and wirelessly transmits power at a level sufficient to charge or power the electric vehicle. For example, the level of power provided wirelessly by the coil 204 may be on the order of kilowatts (KW) (e.g., anywhere from 1 kW to 500 kW, although actual levels may be or higher or lower).

The GAR 206 (including the coil 204 and tuning capacitor $C_1$) and the VAR 222 (including the coil 216 and tuning capacitor $C_2$) may be tuned to substantially the same frequency. The coil 216 may be positioned within the near-field of the base power transfer element and vice versa, as further explained below. The coil 204 and the coil 216 become coupled to one another such that power may be transferred wirelessly from the coil 204 to the coil 216. The series capacitor $C_2$ forms a resonant circuit with the coil 216 that resonates substantially at the operating frequency. The series-tuned resonant circuit shown for VAR 222 should be construed as being exemplary. In another implementation, the capacitor $C_2$ may be coupled with the coil 216 in parallel. In yet other implementations, the VAR 222 may be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the coils 204 and 216 and the tuning (anti-reactance) capacitors C1 and $C_2$, respectively. The VAR 222, including the coil 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 provides the converted power $P_{LDC}$ to the load 218.

The coil 216 and the coil 204, as described throughout the disclosed implementations, may be referred to or configured as "conductor loops", and more specifically, "multi-turn conductor loops" or coils. The base and electric vehicle power transfer elements (e.g., coil 204 and coil 216) may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

Figure 3:
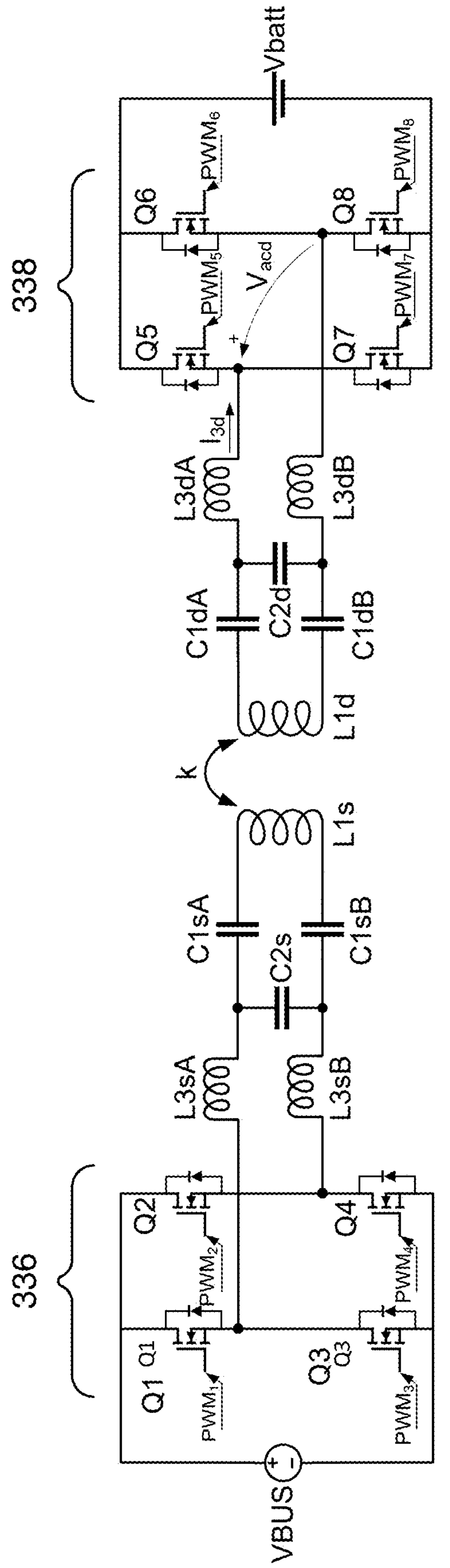

FIG. 3 shows an example bidirectional WPT system in greater detail. The power converters of FIG. 2 are replaced by bidirectional switching inverter/rectifiers 336, 338, which we may generally be referred to as inverters or rectifiers based on their mode of operation in a given situation. Control signals $PWM_1$ through $PWM_8$ control the switching of the metal-oxide-semiconductor field-effect transistors (MOSFETS) Q1 through Q8 in the inverter/rectifiers 336, 338. The control schemes are described later in this disclosure. In this example, impedance matching and filtering is provided by two inductors L3*s*A/B, L3*d*A/B, and three capacitors C1*s*A/B, C2*s*, C1*d*A/B on each side of the WPT coils L1*s*, L1*d*. This example assumes DC input to the ground-side inverter/rectifier 336, shown as VBUS. Such input may be provided, for example, by a bidirectional power-factor-correcting converter (PFC). The figure identifies two values used below: the current $I_{3d}$ into the vehicle-side inverter/rectifier 338 in charging (G2V) mode, and the voltage $V_{acd}$ across the input terminals of the same inverter/rectifier.

Figure 4:
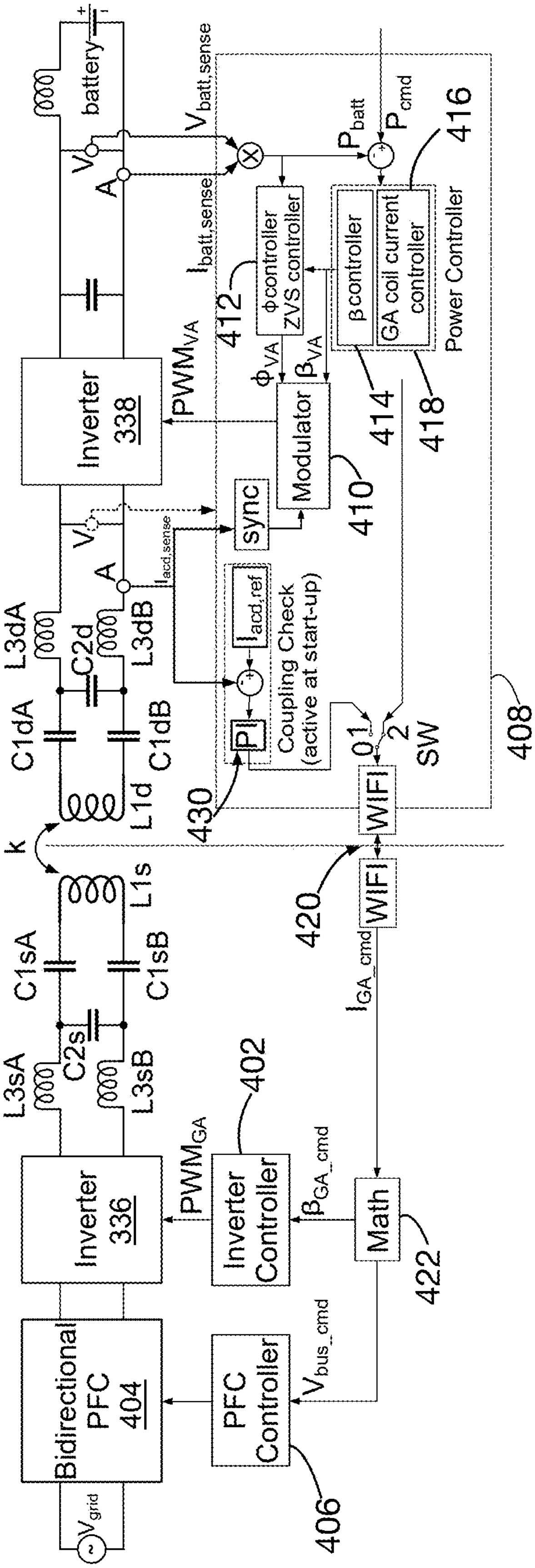

FIG. 4 shows the control logic used to operate the system of FIG. 3. The internal switches Q1 . . . Q8 of the inverter/rectifiers 336 are now shown. The control signals $PWM_1$ through $PWM_4$ for the ground-side switches are represented as $PWM_{GA}$ provided by a ground-side Inverter Controller 402. Note that the VBUS from FIG. 3 is replaced by $V_{grid}$ and a Bidirectional PFC 404, with its own controller 406. On the vehicle side, the Inverter controller 408 is shown in more detail. The control signals $PWM_5$ through $PWM_5$ for the ground-side switches are represented as $PWM_{VA}$ and are provided by a modulator 410. The Modulator receives input messages $\phi_{VA}$ and $\beta_{VA}$ from corresponding controllers 412, 414. The modulator 410 also receives as input a sync signal based on the $I_{acd,sense}$ measurement of inverter input current. The $\phi$ controller 412 is noted as also being a zero voltage switching (ZVS) controller, and receives as its input a parameter $P_{batt}$, the product of $I_{batt,sense}$ and $V_{batt,sense}$, current and voltage measured at the battery. The $\beta$ controller receives as its input the difference of $P_{batt}$ and a power command message $P_{cmd}$. $P_{cmd}$ may be provided by the onboard charger (OBC) or other battery management system (BMS) and represents the power that should be provided to the battery. That is, the input to the $\beta$ controller is the difference between power being supplied to the battery and the power requested.

As shown, the $\beta$ controller 414 is combined with a GA coil current controller 416 in a Power Controller 418. The GA coil current command message $I_{GA\_cmd}$ is sent from the GA coil current controller to the GA over a WiFi link 420. Within the GA, a command processing unit 422 decomposes the $I_{GA\_cmd}$ message into a $V_{bus\_cmd}$ message sent to the PFC controller, indicating the voltage that should be provided to the GA inverter (e.g., inverter/rectifier 336, and a $\beta_{GA\_cmd}$ message sent to the GA inverter controller 402. The coil current is determined by the input voltage $V_{bus}$ and inverter duty cycle $\beta_{GA}$ according to Equation (1):

$$I_{GA} = V_{bus} \times \frac{\sin(\beta_{GA})}{X_{GA}} \times 2 \times \frac{\sqrt{2}}{\pi} \quad \text{Equation (1)}$$

In Equation (1), $X_{GA}$ is the characteristic impedance of the GA side of the system. In both the GA and VA, β and the associated commands refers to the duty cycle of the inverter/rectifier. The symbol ϕ and associated messages refers to the phase shift between the current and voltage input at the VA inverter/rectifier 338. By operating the switches of the inverter/rectifier in synchrony with the zero-crossing of the input current, the voltage can be made to lag or lead the current, thus controlling $\phi_{VA}$.

For Grid-to-Vehicle (G2V) mode (e.g., vehicle charging), it is desired to operate in a constant power mode. For this, the GA is operated to control coil current as requested by the VA, while the VA is operated to control the duty cycle of the rectifier, β. Both inverter/rectifiers are operated as phase-shifted full-bridge devices, which allows all switches to operate with zero voltage switching, and to share losses equally. Maintaining $\phi_{VA}$ between values of 90°−β and 90° maintains zero voltage switching in the rectifier 338. Specifically, for any value of β, ϕ=90°−β represents the boundary of where ZVS can be achieved. Controlling $\phi_{VA}$ also helps to increase power output of the system at weak coupling conditions.

As noted, $I_{GA}$ and $\beta_{VA}$ together determine the power output of the system. The two controllers 414 and 416 can run sequentially or concurrently to implement power control. In some examples, the $\beta_{VA}$ control loop can run faster than the $I_{GA}$ loop, as the $\beta_{VA}$ loop directly regulates output power, while the $I_{GA}$ control loop is limited by WiFi delay. In some examples, the $\beta_{VA}$ loop controls output power with a bandwidth between 5 and 50 Hz, while the $I_{GA}$ loop has a bandwidth less than 5 Hz. At the same time, the $\phi_{VA}$ control loop can operate at 500 Hz to assure ZVS for good efficiency and maximum power output.

Figure 5:
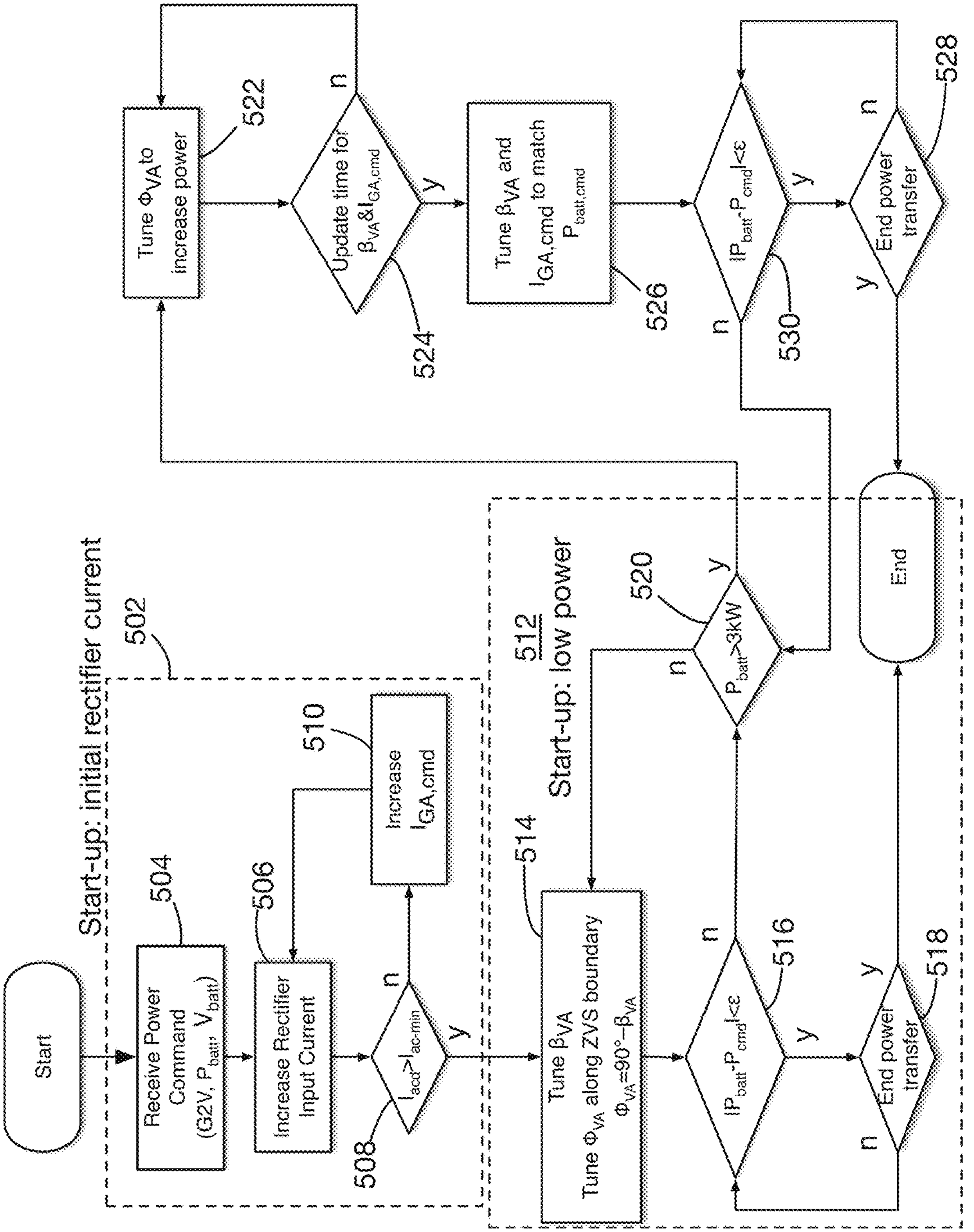
FIG. 5 is a flow chart showing an example order of operations for control loops.

The flow chart in FIG. 5 shows an example order of operations for the control loops. Initially, in a first, initial rectifier current phase 502 of start-up, a power command 504 is received. This command indicates that the present mode is G2V, with a requested power $P_{batt}$ and $V_{batt}$ to be delivered to the battery. VA rectifier input current $I_{acd}$ is then increased, 506, and compared, 508, to a minimum value $I_{ac\text{-}min}$. During this loop, the value of GA current target $I_{GA\text{-}ref}$ is increased, 510, until $I_{acd}$ is less than $I_{ac\text{-}min}$.

Once $I_{acd}$ is greater than $I_{ac\text{-}min}$, the lower-power phase 512 of start-up begins. In this phase, $\beta_{VA}$ and $\phi_{VA}$ are tuned together, 514−$\beta_{VA}$ is set to achieve the desired power output, and $\phi_{VA}$ is set along the ZVS boundary 90°−$\beta_{VA}$. During this phase, battery power $P_{batt}$ is compared 516 to the command $P_{cmd}$. If the difference is less than a threshold ε, the start-up process loops until the $P_{cmd}$ command is changed, or for some other reason the output power deviates from the target, or until the charging process is stopped, 518. When more power is needed, $\beta_{VA}$ command is adjusted until $P_{batt}$ exceeds 3 KW (520), at which point start-up phase can be exited. In full-power operation, $\phi_{VA}$ is initially increased, 522, to increase power output. As noted above, $\beta_{VA}$ and $I_{GA,cmd}$ are updated at lower frequencies than $\phi_{VA}$. Whenever it is time to update one or both of them, 524, these parameters are tuned to match output $P_{batt}$ to the target $P_{cmd}$, 526. Until instructed to stop charging, 528, the output power $P_{batt}$ is compared to the target $P_{cmd}$, 530. If output power remains or has fallen more than ε below the target, or the target has been updated, the tuning steps are repeated. If output power falls below 3 KW (520), the low-power phase of startup is reentered. As long as output power is within the threshold ε of the target, the system continues charging until told to stop, at which point charging ends.

Figure 6:
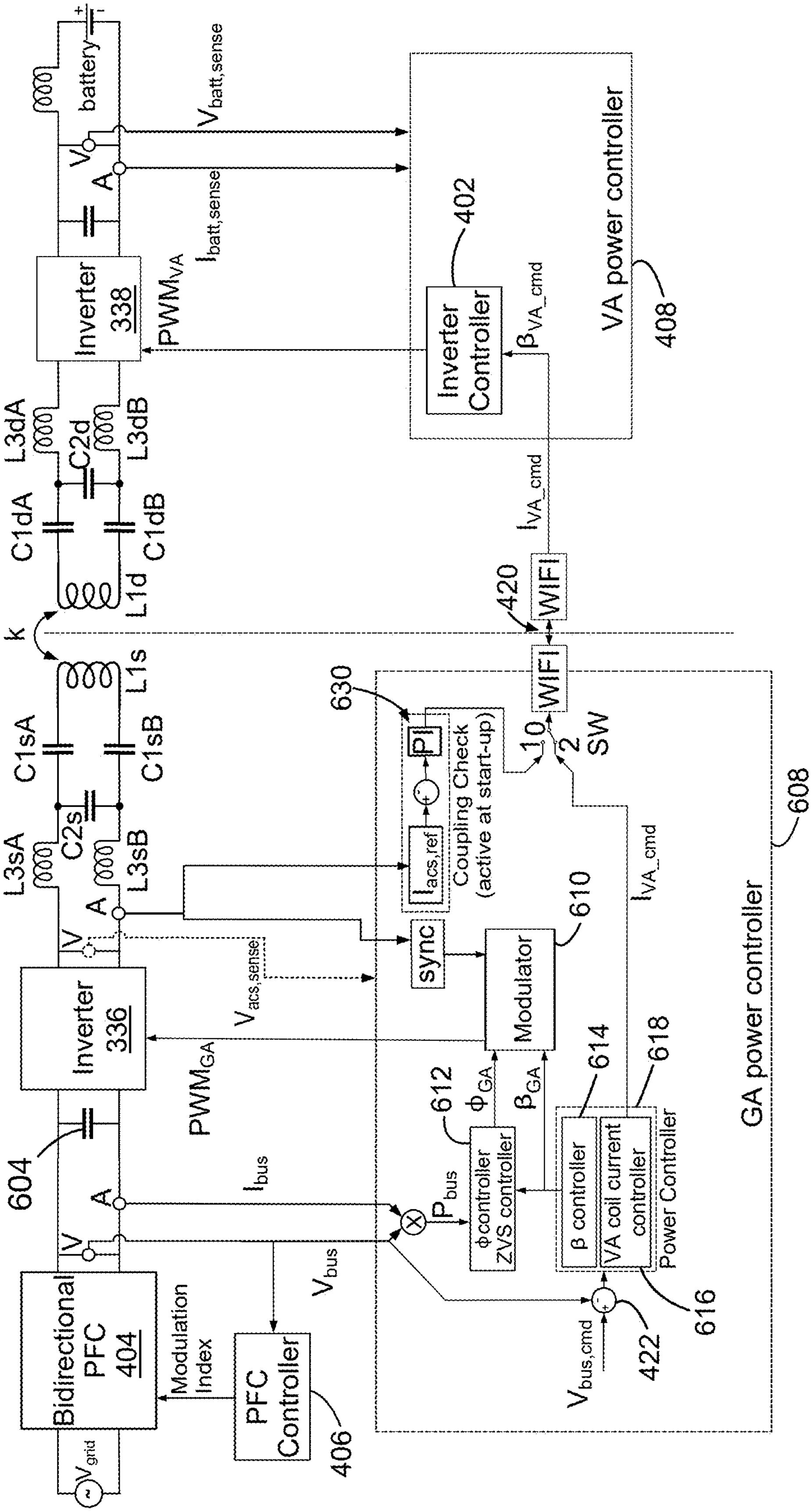

FIG. 6 shows the control logic used to operate the system of FIG. 3 in vehicle-to-grid (V2G) mode. Specifically, the details of the GA power controller 608, which were abstracted as Math block (e.g., command processing unit 422) in FIG. 4, are shown in more detail. This control block is largely the mirror image of the VA power controller 408 in FIG. 4, except that it operates in a voltage control mode, rather than power control. That is, while $P_{bus}$, the DC output power flowing from the inverter/rectifier 336 to the bidirectional PFC 404, again provides the input to the ϕ controller 612, the bus voltage $V_{bus}$, rather than the $V_{bus}\times I_{bus}$ product $P_{bus}$, is compared to a $V_{bus,cmd}$ target and the difference used as the input to the power controller 618. As in FIG. 4, the difference from the target is again used by the GA β controller 614 to set a $\beta_{GA}$ value for the duty cycle of the inverter 556, and by the GA-side VA coil current controller 616 to set the value of $I_{VA,cmd}$ to request coil current in the VA (now operating as the power transmitter). The process of updating the control commands in FIG. 6 may be essentially the same as that shown in FIG. 5, with a change from power control to voltage control.

The Bidirectional PFC 404 and the power system connected to it—shown as $V_{grid}$ in FIG. 6, may be Grid-tied or islanded. In Grid-tied mode, for V2G operation, the PFC provides power to the Grid at the frequency dictated by its Grid connection. For islanded mode, for V2L (load), V2B (building), V2x, etc., operation, the PFC itself determines the voltage and sets the AC frequency for whatever loads are connected to it. Unlike the vehicle charging scenario of FIG. 4, where the power requirements of the battery are expected to be stable and predictable according to the battery's charging curve, the Grid, in V2G situations, or other loads, in V2x modes, may cause unpredictable spikes or dips in demand. Controlling $\phi_{GA}$ allows rapid response to changes in the demand at the PFC and can reduce how much power is required by way of $\beta_{GA}$ or $I_{VA}$ adjustment. Additionally, a capacitor bank 604 provides some measure of buffer, sustaining the required output voltage during the transition time required by the relatively slow WiFi connection 420 and response time of the vehicle charging system to deliver requested increases in power.

FIG. 6 also shows a coupling check block 630, which corresponds to a coupling check 430 on the vehicle side in FIG. 4. The coupling check may confirm that the two WPT systems are aligned with each other by comparing the current through one of the inductors to that provided to the transmit coil on the other side. In some cases, the coupling check may be performed by the same system (VA or GA) in both G2V and V2G/x modes. In other cases, measurements may be made on one side but the calculations are performed on the other. For example, measurements may be made on the vehicle side during G2V, and on the ground side during V2G, but the computations performed by the vehicle in both cases.

The various illustrative logical blocks, modules, circuits, and methods described in connection with the examples disclosed above may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the described aspects.

The various illustrative blocks, modules, and circuits described in connection with disclosed controllers may be implemented or performed with a general-purpose hardware processor, a Digital Signal Processor (DSP), an Application-Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose hardware processor may be a microprocessor, but in the alternative, the hardware processor may be any conventional processor, controller, microcontroller, or state machine. A hardware processor may also be implemented as a combination of computing devices.

The steps of a method and functions described above may be embodied directly in hardware, in a software module executed by a hardware processor, or in a combination of the two. If implemented in software, the functions may be stored on or transmitted as one or more instructions or code on a tangible, non-transitory, computer-readable medium. A software module may reside in Random Access Memory (RAM), flash memory, Read-Only Memory (ROM), or any other form of storage medium known in the art. A storage medium is coupled to the hardware processor such that the hardware processor can read information from, and write information to, the storage medium. In another example, the storage medium may be integral to the hardware processor. The hardware processor and the storage medium may reside in an ASIC.

Unless context dictates otherwise, items represented in the accompanying figures and terms may represent one or more items or terms, and thus reference may be made interchangeably to single or plural forms of the items and terms in this written description. Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed. For example, the context of the above description is wireless charging of electric vehicles, but these techniques may be used in other situations where it is desired to distribute power between various sources and loads.

A number of implementations have been described. Nevertheless, it will be understood that additional modifications may be made without departing from the scope of the concepts described herein, and, accordingly, other embodiments are within the scope of the following claims.

What is claimed is:

1. A bidirectional wireless power transfer (WPT) assembly, comprising:
- a WPT resonator;
- a power transfer connection for coupling to a battery;
- a bidirectional power converter coupled to the WPT resonator and to the power transfer connection;
- a communication interface for communicating with another bidirectional WPT assembly to which the WPT resonator is configured to be coupled; and
- a controller configured to:
  - determine control parameters including first, second, and third control parameters;
  - control the bidirectional power converter based on the first and second control parameters; and
  - communicate the third control parameter to the other bidirectional WPT assembly, the third control parameter including a target coil current in a WPT resonator of the other bidirectional WPT assembly.

2. The bidirectional WPT assembly of claim 1, wherein: the bidirectional WPT assembly is installed in a vehicle, and, during a vehicle charging mode of operation, is configured to determine the control parameters based on output power of the bidirectional WPT assembly.

3. The bidirectional WPT assembly of claim 1, wherein: the bidirectional WPT assembly is a component of a wireless electric vehicle charging station (WEVC), and, during a V2x mode of operation, is configured to:
- determine the first control parameter based on output power; and
- determine the second and third control parameters based on output voltage of the bidirectional WPT assembly.

4. The bidirectional WPT assembly of claim 1, wherein: the first control parameter comprises a target phase shift between a current and voltage input at the bidirectional power converter.

5. The bidirectional WPT assembly of claim 4, wherein: the controller comprises a zero voltage switching (ZVS) controller, which receives as input a first input parameter representing power at an output of the bidirectional power converter, and outputs the first control parameter.

6. The bidirectional WPT assembly of claim 5, wherein: the first input parameter comprises a product of current and voltage measured at the output of the bidirectional power converter.

7. The bidirectional WPT assembly of claim 5, wherein: the second control parameter comprises a target duty cycle of the bidirectional power converter.

8. The bidirectional WPT assembly of claim 7, wherein: the controller further comprises a power controller, which receives as input a second input parameter comprising a difference between the first input parameter and a third input parameter comprising a requested amount of power, and outputs the second control parameter.

9. The bidirectional WPT assembly of claim 8, wherein: the ZVS controller further receives as input the second control parameter, as output from the power controller.

10. The bidirectional WPT assembly of claim 8, wherein: the power controller further outputs the third control parameter.

11. The bidirectional WPT assembly of claim 10, wherein: the controller is further configured to generate an initial value of the third control parameter, and to control whether the initial value of the third control parameter or a value output by the power controller is provided to the other WPT assembly.

12. The bidirectional WPT assembly of claim 11, wherein: the controller is configured to generate the initial value of the third control parameter from a measured value of current into the bidirectional power converter and a minimum current value.

13. The bidirectional WPT assembly of claim 4, wherein: the second control parameter comprises a target duty cycle of the bidirectional power converter; and the controller is configured to update the first control parameter more frequently than it updates the second and third control parameters.

14. The bidirectional WPT assembly of claim 1, wherein: the controller is configured to determine the second and third control parameters concurrently.

15. The bidirectional WPT assembly of claim 1, wherein: the controller is configured to determine the second and third control parameters sequentially.

16. A method of controlling a bidirectional wireless power transfer (WPT) assembly, comprising:

determining first, second, and third control parameters for a bidirectional power converter coupled to a WPT resonator and to a power transfer connection;

controlling the bidirectional power converter based on the first and second control parameters; and communicating the third control parameter to another bidirectional WPT assembly, the third control parameter including a target coil current in a WPT resonator of the other bidirectional WPT assembly.

17. The method of controlling a bidirectional WPT assembly of claim 16, wherein:

determining the first control parameter comprises determining a target phase shift between a current and voltage input at the bidirectional power converter based on a first input parameter representing power at an output of the bidirectional power converter.

18. The method of controlling a bidirectional WPT assembly of claim 17, wherein:

the first input parameter comprises a product of current and voltage measured at the output of the bidirectional power converter.

19. The method of controlling a bidirectional WPT assembly of claim 17, wherein:

determining the second control parameter comprises determining a target duty cycle of the bidirectional power converter based on a second input parameter comprising a difference between the first input parameter and a third input parameter comprising a requested amount of power.

20. The method of controlling a bidirectional WPT assembly of claim 16, wherein:

the second control parameter comprises a target duty cycle of the bidirectional power converter, and the method further includes updating the first control parameter more frequently than the second and third control parameters are updated.

21. A bidirectional wireless power transfer (WPT) controller, comprising:

an output for providing control commands to a bidirectional power converter;

an input for receiving operating parameters of the bidirectional power converter and a target output value; and a communication interface for communicating with another bidirectional WPT assembly, wherein:

the controller is configured to:

determine first, second, and third control parameters;

communicate the first and second control parameter to the bidirectional power converter; and communicate the third control parameter to the other bidirectional WPT assembly, the third control parameter including a target coil current in a WPT resonator of the other bidirectional WPT assembly;

the operating parameters include output voltage and output power of the bidirectional power converter;

the target output value is selected from one of the output power or the output voltage of the bidirectional power converter;

the first control parameter is based on the output power; and the second and third control parameters are based on whichever of the output voltage or the output power is selected as the target output value.

* * * * *